(12) United States Patent
Yu et al.

(10) Patent No.: US 9,198,240 B2
(45) Date of Patent: Nov. 24, 2015

(54) CONSTANT CURRENT CONTROL CIRCUIT

(71) Applicant: SHENZHEN SKYWORTH-RGB ELECTRONICS CO. LTD., Shenzhen, Guangdong Prov. (CN)

(72) Inventors: Zhao-Fu Yu, Shenzhen (CN); Ji Bai, Shenzhen (CN); Yan-Sheng Shao, Shenzhen (CN); Xian-Liang Luo, Shenzhen (CN)

(73) Assignee: SHENZHEN SKYWORTH-RGB ELECTRONICS CO. LTD., Shenzhen, Guangdong Prov. (CN)

( * ) Notice: Subject to any disclaimer, the term of this patent is extended or adjusted under 35 U.S.C. 154(b) by 343 days.

(21) Appl. No.: 13/844,872

(22) Filed: Mar. 16, 2013

(65) Prior Publication Data

US 2014/0015440 A1    Jan. 16, 2014

(30) Foreign Application Priority Data

Jul. 9, 2012   (CN) .......................... 2012 1 0235194

(51) Int. Cl.
H05B 37/02      (2006.01)
H05B 33/08      (2006.01)

(52) U.S. Cl.
CPC ........ *H05B 33/0815* (2013.01); *H05B 33/0827* (2013.01)

(58) Field of Classification Search
None
See application file for complete search history.

(56) References Cited

U.S. PATENT DOCUMENTS

| 2010/0026207 A1* | 2/2010 | Facchini et al. ............... 315/294 |
| 2010/0148697 A1* | 6/2010 | Bayat et al. ................... 315/294 |
| 2014/0160609 A1* | 6/2014 | Chen et al. ..................... 361/86 |

* cited by examiner

*Primary Examiner* — Long Nguyen
(74) *Attorney, Agent, or Firm* — Tim Tingkang Xia, Esq.; Locke Lord LLP

(57) ABSTRACT

A constant current control circuit includes a current source output module and at least two output circuits. Each of the output circuits includes an automatic constant current regulating module, a power transistor drive and control module electrically coupled to automatic constant current regulating module, and a load module formed of one or more LED devices and electrically coupled to a power transistor drive and control module. The constant current control circuit in operation tracks changes in current of each output circuit and regulates the currents of all the output circuits accordingly.

4 Claims, 3 Drawing Sheets

CONSTANT CURRENT CONTROL CIRCUIT

CROSS-REFERENCE TO RELATED APPLICATION

This application claims the priority to Chinese Patent Application No. 201210235194.4, filed in the State Intellectual Property Office of P.R. China, on Jul. 9, 2012, which is hereby incorporated herein in its entirety by reference.

FIELD OF THE INVENTION

The present invention relates generally to integrated circuit designing, and more particularly to a constant current control circuit.

BACKGROUND OF THE INVENTION

Light emitting diodes (LEDs), as a low-power consumption, environmentally friendly light source, are widely applied in the fields such as lighting and backlight display. To make an LED emit stable light, a current flowing through the LED is required to be relatively constant, and especially, when LEDs are used as a backlight source for a display, the currents flowing through each LED chip are further required be equalized as much as possible, in order to achieve a desirable display effect. In other words, a constant current control circuit is an indispensable module of an LED light source.

Nowadays, commercially available constant current control circuits generally require using power transistors including NMOS, PMOS, NPN and PNP power transistors to regulate the voltage drop related to each power transistor, so as to implement current regulation to make the currents flowing through different LED chips equal. If the power transistors are built-in, the chip area is increased, and the chip cost is also increased. Also, the heat dissipation problem of the power transistors cannot be solved easily.

Therefore, a heretofore unaddressed need exists in the art to address the aforementioned deficiencies and inadequacies.

SUMMARY OF THE INVENTION

The present invention is directed to a constant current control circuit that uses power transistors externally, which is not only capable of automatic regulation and having a high control precision, but also overcomes the defects of the large chip area and high cost of a constant current control circuit having built-in power transistors.

In one embodiment, the constant current control circuit includes a current source output module and at least two output circuits. Each of the output circuits includes an automatic constant current regulating module, a power transistor drive and control module, and a load module formed of one or more LED devices.

For each output circuit, an input terminal of the automatic constant current regulating modules is connected to an output terminal of the current source output module. The power transistor drive and control modules is respectively connected to two output terminals of the automatic constant current regulating module. The load module has a first terminal connected to a DC (direct current) power supply, and a second terminal connected to an output terminal of the power transistor drive and control module.

According to embodiments of the present invention, the constant current control circuit tracks changes in current of each output circuit by using a simple circuit structure, and then regulates the currents of all the output circuits as a whole, so as to reduce the currents in some output circuits that experience a current increase, and increase the currents in the other output circuits that experience a current decrease, so that all the output circuits jointly maintain a stable current value, thereby, enabling the whole system to be always in a dynamic balance. As such, the current changes in each output circuit are very small, which makes the current regulation faster and more accurate.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF THE INVENTION

Figure 1:
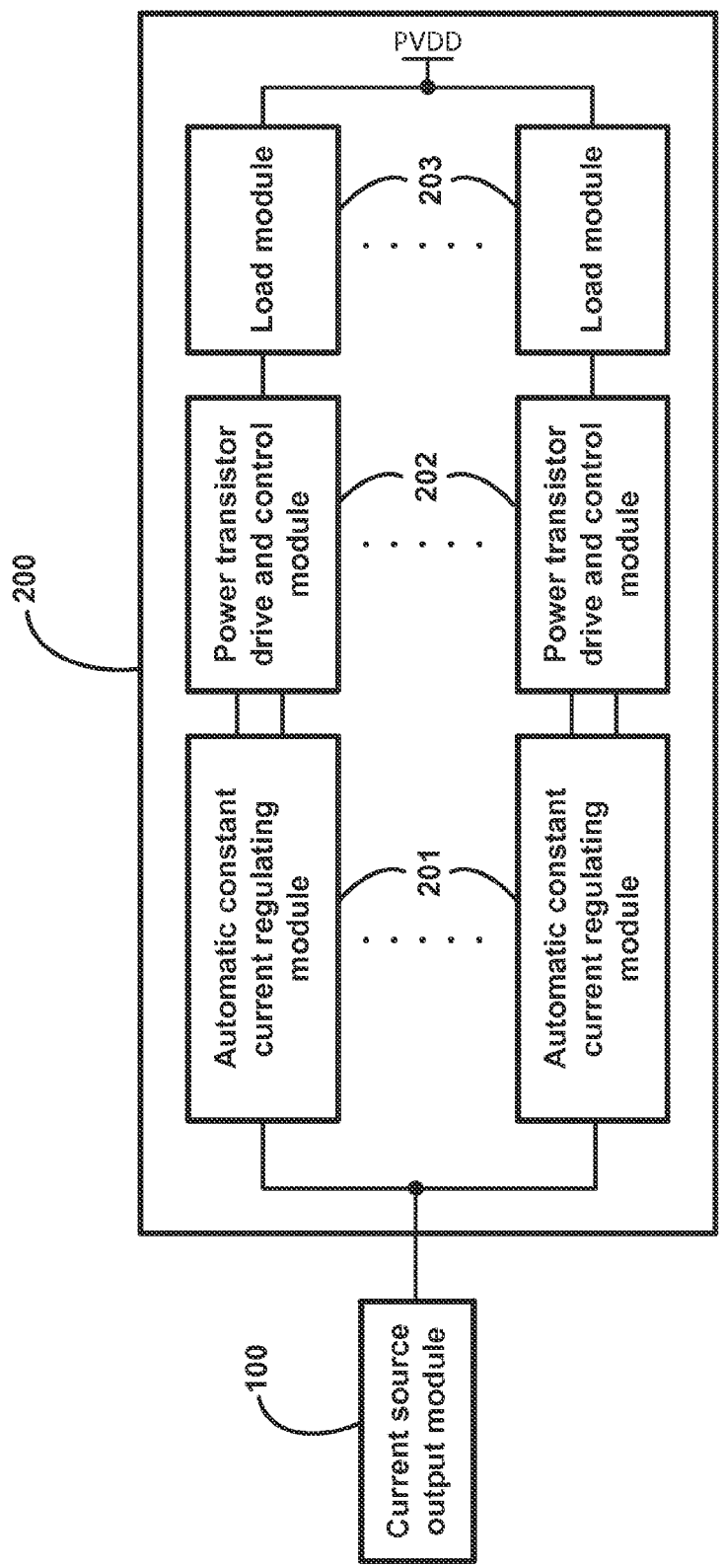
FIG. 1 shows a structural block diagram of a constant current control circuit according to one embodiment of the present invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings in FIGS. 1-3. It should be understood that specific embodiments described herein are merely used for explaining the present invention, but are not intended to limit the present invention. In accordance with the purposes of this disclosure, as embodied and broadly described herein, this invention, in one aspect, relates to a constant current control circuit capable of automatic regulation, which includes a current source output module and at least two output circuits, where each of the output circuits includes an automatic constant current regulating module, a power transistor drive and control module, and a load module formed of one or more LED devices. According to the invention, changes in current of each output circuit is tracked by using a simple circuit structure, and then the currents of all the output circuits are regulated as a whole, so that all the output circuits jointly maintain a stable current value, thereby, enabling the whole system to be always in a dynamic balance. In invention provides a novel constant current control circuit structure for the rapidly developing integrated circuit designing industry.

Referring to FIG. 1, a structural block diagram of a constant current control circuit is shown according to one embodiment of the present invention. In this exemplary embodiment, the constant current control circuit includes a current source output module 100 and at least two output circuits 200. Each of the output circuits 200 includes an automatic constant current regulating module 201, a power transistor drive and control module 202 electrically coupled to the automatic constant current regulating module 201, and a load module 203 formed of one or more LED lamps/devices and electrically coupled to power transistor drive and control module 202. For each of the output circuits 200, an input terminal of the automatic constant current regulating module 201 is connected to an output terminal of the current source output module 100; the power transistor drive and control module 202 is respectively connected to two output terminals of the automatic constant current regulating module 201; and a first terminal of the load module 203 is connected to a first DC (direct current) power supply PVDD, while a second terminal of the load module 203 is connected to an output terminal of the power transistor drive and control module 202.

In one embodiment, the current source output module 100 includes a reference current source IBIAS, and a bus current mirror formed of a p-channel metal-oxide-semiconductor (PMOS) transistor M1 and a PMOS transistor M2. Sources of the PMOS transistor M1 and the PMOS transistor M2 are connected to a second DC power supply VDD; a gate and a drain of the PMOS transistor M1 are connected together and then connected to a gate of the PMOS transistor M2; the reference current source IBIAS is connected between the drain of the PMOS transistor M1 and ground; and a drain of the PMOS transistor M2 is the output terminal of the current source output module 100.

For each of the output circuits 200, the automatic constant current regulating module 201 includes a transistor pair formed of a PMOS transistor Mn1 and a PMOS transistor Mn2, a first current mirror formed of an n-channel metal-oxide-semiconductor (NMOS) transistor Mn3 and an NMOS transistor Mn4, a second current mirror formed of a PMOS transistor Mn5 and a PMOS transistor Mn6, a first current sensing resistor Rn1 and a second current sensing resistor Rn2, where n=1, 2, 3, ... N, corresponding to the n-th output circuit, and N is the total number of the output circuits 200, which is equal to or greater than 2. In one embodiment, a gate of the PMOS transistor Mn1 and a gate of the PMOS transistor Mn2 are connected together; and a common connection terminal of the gate of the PMOS transistor Mn1 and the gate of the PMOS transistor Mn2 constitutes a first output terminal of the automatic constant current regulating module 201. The first current sensing resistor Rn1 is connected between the first output terminal and ground. A source of the PMOS transistor Mn1 and a source of the PMOS transistor Mn2 are connected to the drain of the PMOS transistor M2 at the same time, while a drain of the PMOS transistor Mn1 and a drain of the PMOS transistor Mn2 are connected to a drain of the NMOS transistor Mn3. The drain and a gate of the NMOS transistor Mn3 are connected together and then connected to a gate of the NMOS transistor Mn4, while a source of the NMOS transistor Mn3 and a source of the NMOS transistor Mn4 are grounded. A drain of the NMOS transistor Mn4 is connected to a drain of the PMOS transistor Mn5. A gate and the drain of the PMOS transistor Mn5 are connected together and then connected to a gate of the PMOS transistor Mn6. A source of the PMOS transistor Mn5 and a source of the PMOS transistor Mn6 are both connected to the second DC power supply VDD. The second current sensing resistor Rn2 is connected between a drain of the PMOS transistor Mn6 and ground. The common connection terminal of the drain of the PMOS transistor Mn6 and the second current sensing resistor Rn2 is a second output terminal of the automatic constant current regulating module 201.

For each of the output circuits 200, in one embodiment, the power transistor drive and control module 202 includes an operational amplifier OPn1 and a PNP-type triode Qn1. A positive input terminal of the operational amplifier OPn1 is connected to a reference voltage source VREF; a negative input terminal of the operational amplifier OPn1 is connected to the second output terminal of the automatic constant current regulating module 201; an output terminal of the operational amplifier OPn1 is connected to a base of the PNP-type triode Qn1; a collector of the PNP-type triode Qn1 is connected to the first output terminal of the automatic constant current regulating module 201; and an emitter of the PNP-type triode Qn1 is the output terminal of the power transistor drive and control module 202, which is connected to the second terminal of the load module 203.

For each of the output circuits 200, in another embodiment, the power transistor drive and control module 202 includes an operational amplifier OPn1 and an NMOS transistor Mn7. A negative input terminal of the operational amplifier OPn1 is connected to a reference voltage source VREF; a positive input terminal of the operational amplifier OPn1 is connected to the second output terminal of the automatic constant current regulating module 201; an output terminal of the operational amplifier OPn1 is connected to a gate of the NMOS transistor Mn7; a source of the NMOS transistor Mn7 is connected to the first output terminal of the automatic constant current regulating module 201; and a drain of the NMOS transistor Mn7 is the output terminal of the power transistor drive and control module 202, which is connected to the second terminal of the load module 203.

Figure 2:
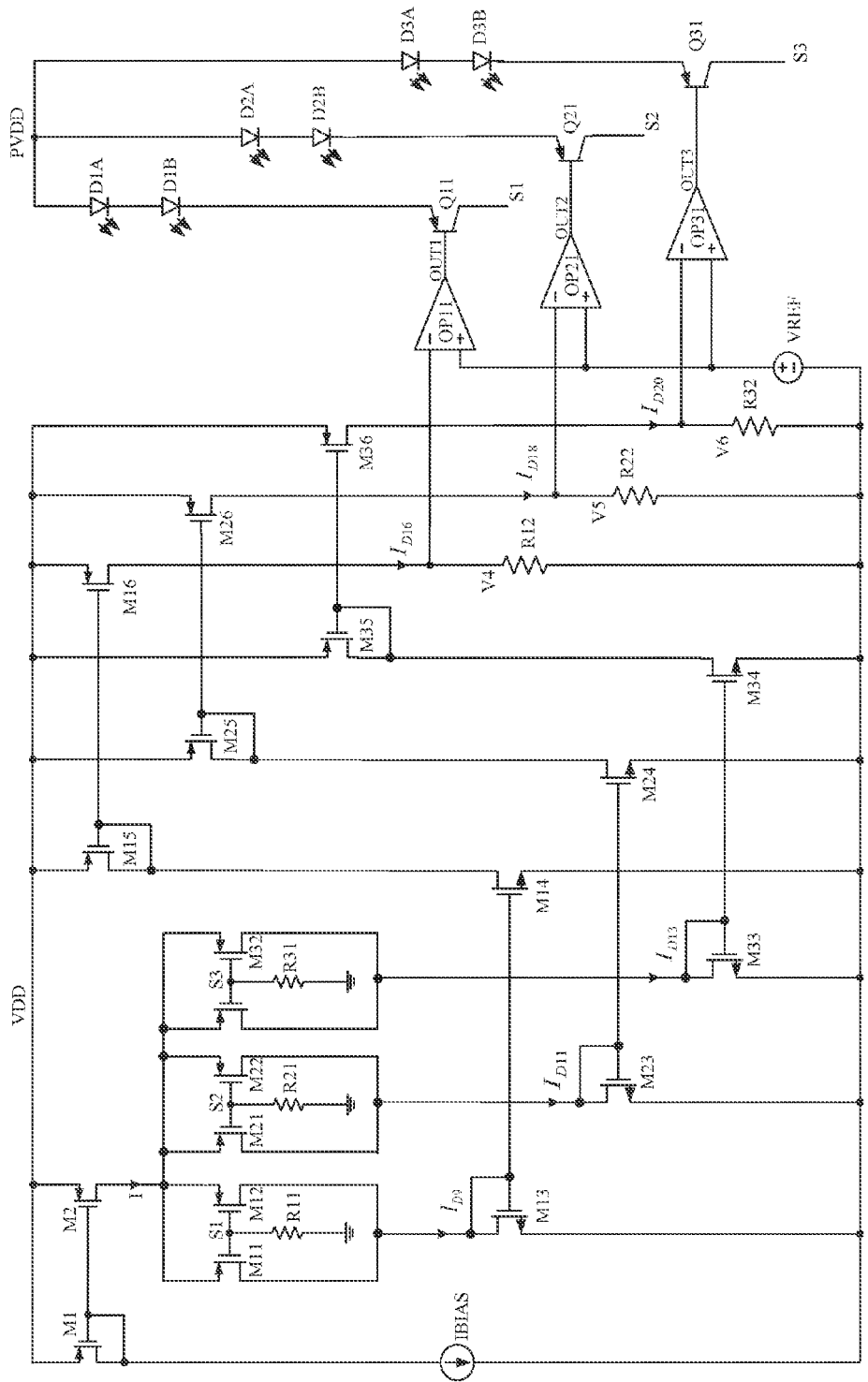
FIG. 2 shows an exemplary circuit diagram of a constant current control circuit according to one embodiment of the present invention.

FIG. 2 shows an exemplary circuit diagram illustrating electronic parts and components in a constant current control circuit according to one embodiment of the present invention. In this exemplary embodiment, the constant current control circuit has three output circuits. The connections and working principle of the electronic parts and components in the constant current control circuit provided in this embodiment are specifically described below by the way of example.

As shown in FIG. 2, the constant current control circuit includes a current source output module and three output circuits. Each of the output circuits includes an automatic constant current regulating module, a power transistor drive and control module, and a load module formed of a plurality of serially connected LED lamps/devices. The current source output module includes a reference current source IBIAS and a bus current mirror formed of a PMOS transistor M1 and a PMOS transistor M2. Sources of the PMOS transistor M1 and the PMOS transistor M2 are connected to the DC power supply VDD. A gate and a drain of the PMOS transistor M1 are connected together and then connected to a gate of the PMOS transistor M2. The reference current source IBIAS is connected between the drain of the PMOS transistor M1 and ground. A drain of the PMOS transistor M2 is an output terminal of the current source output module.

The automatic constant current regulating module of the first output circuit includes a transistor pair formed of a PMOS transistor M11 and a PMOS transistor M12, a first current mirror formed of an NMOS transistor M13 and an NMOS transistor M14, a second current mirror formed of a PMOS transistor M15 and a PMOS transistor M16, a current sensing resistor R11 and a current sensing resistor R12, where a gate of the PMOS transistor M11 and a gate of the PMOS transistor M12 are connected together; a common connection terminal of the gate of the PMOS transistor M11 and the gate of the PMOS transistor M12 is a first output terminal of the automatic constant current regulating module; the current sensing resistor R11 is connected between the first output terminal and ground; a source of the PMOS transistor M11 and a source of the PMOS transistor M12 are connected to the drain of the PMOS transistor M2; a drain of the PMOS transistor M11 and a drain of the PMOS transistor M12 are connected to a drain of the NMOS transistor M13; the drain and a gate of the NMOS transistor M13 are connected together and then connected to a gate of the NMOS transistor M14; a source of the NMOS transistor M13 and a source of the NMOS transistor M14 are grounded; a drain of the NMOS transistor M14 is connected to a drain of the PMOS transistor M15; a gate and the drain of the PMOS transistor M15 are connected together and then connected to a gate of the PMOS transistor M16; a source of the PMOS transistor M15 and a source of the PMOS transistor M16 are both connected to the second DC power supply VDD, the current sensing resistor R12 is connected between a drain of the PMOS transistor M16 and ground; and a common connection terminal of the drain of the PMOS transistor M16 and the current sensing resistor R12 is a second output terminal of the automatic constant current regulating module.

In this embodiment, the power transistor drive and control module of the first output circuit uses a triode as the power transistor, that is, the power transistor drive and control module includes an operational amplifier OP11 and a PNP-type triode Q11, where a positive input terminal of the operational amplifier OP11 is connected to a reference voltage source VREF; a negative input terminal of the operational amplifier OP11 is connected to the second output terminal of the automatic constant current regulating module; an output terminal of the operational amplifier OP11 is connected to a base of the PNP-type triode Q11; a collector of the PNP-type triode Q11 is connected to the first output terminal of the automatic constant current regulating module; and an emitter of the PNP-type triode Q11 is an output terminal of the power transistor drive and control module and is connected to a second terminal of the load module.

Further, the load module of the first output circuit includes an LED D1A and an LED D1B, where an anode of the LED D1A is connected to the first DC power supply PVDD; a cathode of the LED D1A is connected to an anode of the LED D1B; and a cathode of the LED D1B is connected to the emitter of the PNP-type triode Q11.

Correspondingly, the automatic constant current regulating module of the second output circuit includes a transistor pair formed of a PMOS transistor M21 and a PMOS transistor M22, a first current mirror formed of an NMOS transistor M23 and an NMOS transistor M24, a second current mirror formed of a PMOS transistor M25 and a PMOS transistor M26, a current sensing resistor R21 and a current sensing resistor R22, where a gate of the PMOS transistor M21 and a gate of the PMOS transistor M22 are connected together; a common connection terminal of the gate of the PMOS transistor M21 and the gate of the PMOS transistor M22 is a first output terminal of the automatic constant current regulating module; the current sensing resistor R21 is connected between the first output terminal and ground; a source of the PMOS transistor M21 and a source of the PMOS transistor M22 are connected to the drain of the PMOS transistor M2 at the same time; a drain of the PMOS transistor M21 and a drain of the PMOS transistor M22 are connected to a drain of the NMOS transistor M23 at the same time; the drain and a gate of the NMOS transistor M23 are connected together and then connected to a gate of the NMOS transistor M24; a source of the NMOS transistor M23 and a source of the NMOS transistor M24 are grounded; a drain of the NMOS transistor M24 is connected to a drain of the PMOS transistor M25; a gate and the drain of the PMOS transistor M25 are connected together and then connected to a gate of the PMOS transistor M26; a source of the PMOS transistor M25 and a source of the PMOS transistor M26 are both connected to the second DC power supply VDD; the current sensing resistor R22 is connected between a drain of the PMOS transistor M26 and ground; and a common connection terminal of the drain of the PMOS transistor M26 and the current sensing resistor R22 is a second output terminal of the automatic constant current regulating module of the second output circuit.

The power transistor drive and control module of the second output circuit includes an operational amplifier OP21 and a PNP-type triode Q21; where a positive input terminal of the operational amplifier OP21 is connected to a reference voltage source VREF; a negative input terminal of the operational amplifier OP21 is connected to the second output terminal of the automatic constant current regulating module; an output terminal of the operational amplifier OP21 is connected to a base of the PNP-type triode Q21; a collector of the PNP-type triode Q21 is connected to the first output terminal of the automatic constant current regulating module; and an emitter of the PNP-type triode Q21 is an output terminal of the power transistor drive and control module and is connected to a second terminal of the load module.

The load module of the second output circuit includes an LED D2A and an LED D2B, where an anode of the LED D2A is connected to the first DC power supply PVDD; a cathode of the LED D2A is connected to an anode of the LED D2B; and a cathode of the LED D2B is connected to the emitter of the PNP-type triode Q21.

Likewise, the automatic constant current regulating module of the third output circuit includes a transistor pair formed of a PMOS transistor M31 and a PMOS transistor M32, a first current mirror formed of an NMOS transistor M33 and an NMOS transistor M34, a second current mirror formed of a PMOS transistor M35 and a PMOS transistor M36, a current sensing resistor R31 and a current sensing resistor R32, where a gate of the PMOS transistor M31 and a gate of the PMOS transistor M32 are connected together; a common connection terminal of the gate of the PMOS transistor M31 and the gate of the PMOS transistor M32 is a first output terminal of the automatic constant current regulating module; the current sensing resistor R31 is connected between the first output terminal and ground; a source of the PMOS transistor M31 and a source of the PMOS transistor M32 are connected to the drain of the PMOS transistor M2 at the same time; a drain of the PMOS transistor M31 and a drain of the PMOS transistor M32 are connected to a drain of the NMOS transistor M33 at the same time; the drain and a gate of the NMOS transistor M33 are connected together and then connected to a gate of the NMOS transistor M34; a source of the NMOS transistor M33 and a source of the NMOS transistor M34 are grounded; a drain of the NMOS transistor M34 is connected to a drain of the PMOS transistor M35; a gate and the drain of the PMOS transistor M35 are connected together and then connected to a gate of the PMOS transistor M36; a source of the PMOS transistor M35 and a source of the PMOS transistor M36 are both connected to the second power supply VDD; the current sensing resistor R32 is connected between a drain of the PMOS transistor M36 and ground; and a common connection terminal of the drain of the PMOS transistor M36 and the current sensing resistor R32 is a second output terminal of the automatic constant current regulating module of the third output circuit.

The power transistor drive and control module of the third output circuit includes an operational amplifier OP31 and a PNP-type triode Q31, where a positive input terminal of the operational amplifier OP31 is connected to a reference voltage source VREF; a negative input terminal of the operational amplifier OP31 is connected to the second output terminal of the automatic constant current regulating module; an output terminal of the operational amplifier OP31 is connected to a base of the PNP-type triode Q31; a collector of the PNP-type triode Q31 is connected to the first output terminal of the automatic constant current regulating module; and an emitter of the PNP-type triode Q31 is an output terminal of the power transistor drive and control module and is connected to a second terminal of the load module.

The load module of the third output circuit includes an LED D3A and an LED D3B, where an anode of the LED D3A is connected to the first DC power supply PVDD; a cathode of the LED D3A is connected to an anode of the LED D3B; and a cathode of the LED D3B is connected to the emitter of the PNP-type triode Q31.

The working principle of the constant current control circuit shown in FIG. 2 is as follows: in a normal stable state:

$$I_{D9} = I_{D11}$$
$$= I_{D13}$$
$$= \frac{I}{3}, V_{S1}$$
$$= V_{S2}$$
$$= V_{S3},$$

and $$I_{D9} + I_{D11} + I_{D13} = I = \text{constant.}$$

Assuming that a current I1 of the LED load module in the first output circuit increases abruptly, a voltage $V_{S1}$ of a node S1 increases, and since $$I_{DS} = \frac{1}{2} C_{OX} \cdot \mu_p \cdot \frac{W}{L} \cdot (V_{GS} \downarrow - V_{th})^2 \cdot (1 + \lambda \cdot V_{DS}),$$

a current $I_{D9}$ decreases. Since $I_{D9}+I_{D11}+I_{D13}=I=$constant, currents $I_{D11}$ and $I_{D13}$ increase. Accordingly, a current $I_{D16}$ decreases, and currents $U_{D18}$ and $I_{D20}$ increase; a voltage $V_4$ decreases, and voltages $V_5$ and $V_6$ increase. After processing of the operational amplifiers OP11, OP21 and OP31, a voltage $V_{OUT1}$ of a node OUT1 increases, and voltages $V_{OUT2}$ and $V_{OUT3}$ of nodes OUT2 and OUT3 decrease. Since the current value in each output circuit is approximately equal to the emitter current value of the PNP power transistor, that is, $$I_E = I_S \cdot \exp\left(\frac{V_{EB}}{V_T}\right),$$

the current value in the first output circuit decreases, and the current values in the second and third current values increase; when the currents in the output circuits are equal, that is, $V_{S1}=V_{S2}=V_{S3}$, the whole constant current system returns to the normal stable state.

Assuming that the current I1 of the LED light emitting chips in the first output circuit decreases abruptly, the voltage $V_{S1}$ of the node S1 decreases, and since $$I_{DS} = \frac{1}{2} C_{OX} \cdot \mu_p \cdot \frac{W}{L} \cdot (V_{GS}\uparrow - V_{th})^2 \cdot (1 + \lambda \cdot V_{DS}),$$

the current $I_{D9}$ increases. Since, $I_{D9}+I_{D11}+D_{13}=I=$constant the currents $I_{D11}$ and $I_{D13}$ decrease. Accordingly, the current $I_{D16}$ increases, and the currents $I_{D18}$ and $I_{D20}$ decrease; the voltage $V_4$ increases, and the voltages $V_5$ and $V_6$ decrease. After processing of the operational amplifiers OP11, OP21 and OP31, the voltage $V_{OUT1}$ of the node OUT1 decreases, and the voltages $V_{OUT2}$ and $V_{OUT3}$ of the nodes OUT2 and OUT3 increase. Since the current value in each output circuit is approximately equal to the emitter current value of the PNP power transistor, that is, $$I_E = I_S \cdot \exp\left(\frac{V_{EB}}{V_T}\right),$$

the current value in the first output circuit increases, and the current values in the second and third current values decrease; when the currents in the output circuits are equal, that is, $V_{S1}=V_{S2}=V_{S3}$, the whole constant current system returns to the normal stable state.

Accordingly, the whole constant current control circuit reduces the currents in some output circuits that experience a current increase, and increases the currents in the other output circuits that experience a current decrease, so that all the output circuits jointly maintain a stable current value, thereby, enabling the whole system to be always in a dynamic balance.

Figure 3:
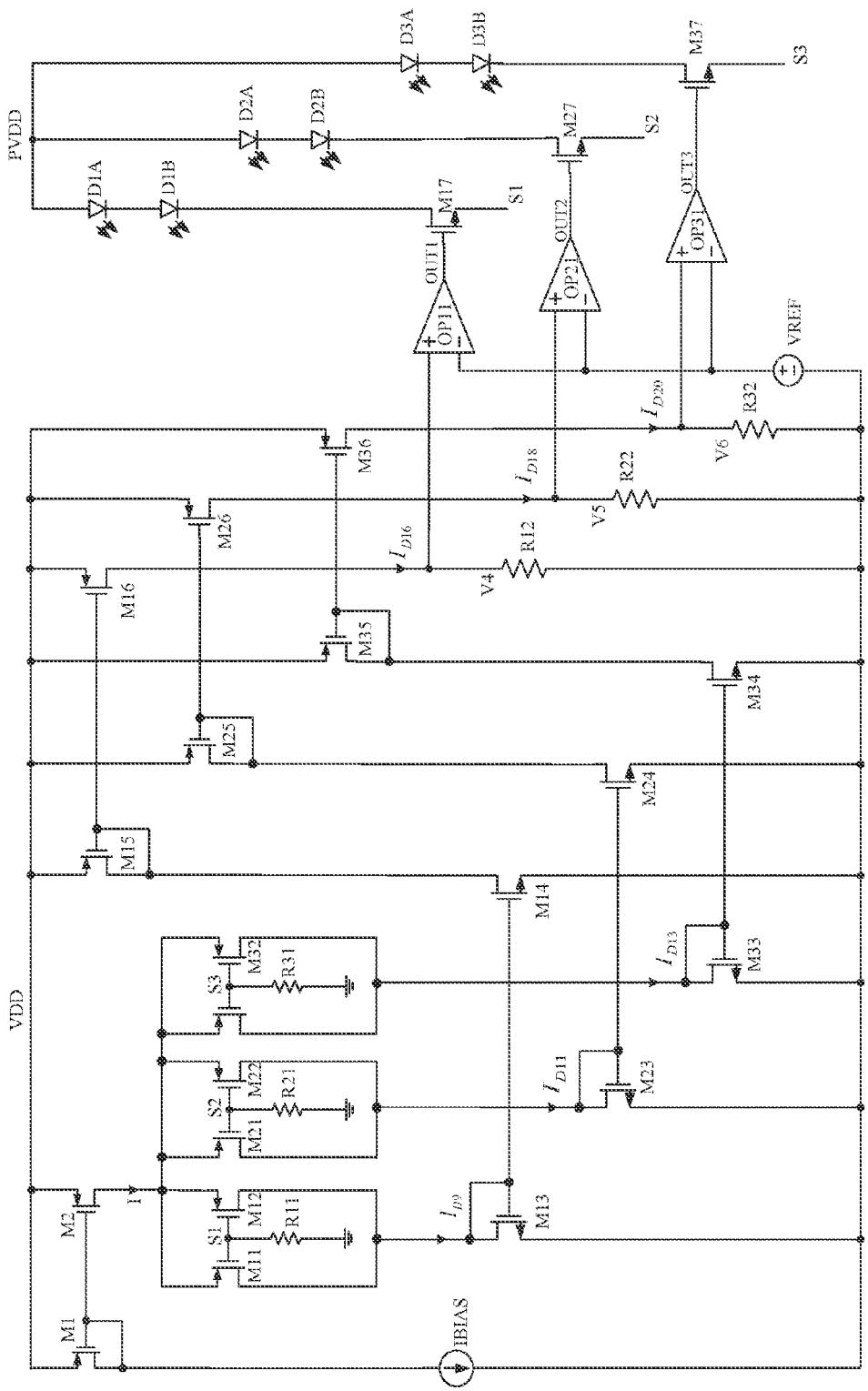
FIG. 3 is an exemplary circuit diagram of a constant current control circuit according to another embodiment of the present invention.

FIG. 3 is an exemplary circuit diagram illustrating electronic parts and components in a constant current control circuit according to another embodiment of the present invention. The constant current control circuit has the similar structural to that shown in FIG. 2, except that the power transistor drive and control module of each of three output circuits uses an NMOS transistor as the power transistors. Each of the power transistor drive and control modules includes an operational amplifier OPn1 and an NMOS transistor Mn7, where a negative input terminal of the operational amplifier OPn1 is connected to a reference voltage source VREF; a positive input terminal of the operational amplifier OPn1 is connected to the second output terminal of the automatic constant current regulating module; an output terminal of the operational amplifier OPn1 is connected to a gate of the NMOS transistor Mn7; a source of the NMOS transistor Mn7 is connected to the first output terminal of the automatic constant current regulating module; and a drain of the NMOS transistor Mn7 is the output terminal of the power transistor drive and control module and is connected to the second terminal of the load module. The connections of other modules is the same as that shown in FIG. 2, and the details will not be described herein again.

In brief, the invention, among other things, recites a constant current control circuit that tracks changes in current of each output circuit by using a simple circuit structure, and then regulates the currents of all the output circuits as a whole, so that the current changes in each output circuit are very small, thereby achieving faster current regulation. According to the invention, each output circuit only requires one transistor pair, two current mirrors, two resistors, one operational amplifier and one power transistor, and there are no needs of numerous digital logics and complex comparators of conventional output circuits. Furthermore, the constant current control circuit provided by the present invention has a high current control precision. The precision of the current of each output circuit is mainly dependent on the external current sensing resistor, and if the precision of the external resistor is about ±1%, the error of the current in each output circuit is also approximately ±1%.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A constant current control circuit, comprising:
   a current source output module; and
   at least two output circuits, each of the output circuits comprising an automatic constant current regulating module, a power transistor drive and control module, and a load module formed of one or more light emitting diode (LED) lamps,
   wherein, for each output circuit, an input terminal of the automatic constant current regulating module is connected to an output terminal of the current source output module, the power transistor drive and control module is connected to two output terminals of the automatic constant current regulating module, a first terminal of the load module is connected to a first DC power supply PVDD, and a second terminal of the load module is connected to an output terminal of the power transistor drive and control module; and
   wherein the current source output module has an output terminal, and comprises:
   a reference current source IBIAS; and
   a bus current mirror formed of a PMOS transistor M1 and a PMOS transistor M2,
   wherein sources of the PMOS transistor M1 and the PMOS transistor M2 are connected to a second DC power supply VDD, a gate and a drain of the PMOS transistor M1 are commonly connected to a gate of the PMOS transistor M2, the reference current source IBIAS is connected between the drain of the PMOS transistor M1 and ground, and a drain of the PMOS transistor M2 is connected to the output terminal of the current source output module.

2. A constant current control circuit, comprising:
a current source output module; and
at least two output circuits, each of the output circuits comprising an automatic constant current regulating module, a power transistor drive and control module, and a load module formed of one or more light emitting diode (LED) lamps,
wherein, for each output circuit, an input terminal of the automatic constant current regulating module is connected to an output terminal of the current source output module, the power transistor drive and control module is connected to two output terminals of the automatic constant current regulating module, a first terminal of the load module is connected to a first DC power supply PVDD, and a second terminal of the load module is connected to an output terminal of the power transistor drive and control module, and
wherein, for each output circuit, the automatic constant current regulating module has a input terminal connected to the output terminal of the current source output module, a first output terminal and a second output terminal, and comprises:
a transistor pair formed of a PMOS transistor Mn1 and a PMOS transistor Mn2;
a first current mirror formed of an NMOS transistor Mn3 and an NMOS transistor Mn4;
a second current mirror formed of a PMOS transistor Mn5 and a PMOS transistor Mn6; and
a first current sensing resistor Rn1 and a second current sensing resistor Rn2,
wherein a gate of the PMOS transistor Mn1 and a gate of the PMOS transistor Mn2 are commonly connected the first output terminal of the automatic constant current regulating module, the first current sensing resistor Rn1 is connected between the first output terminal and ground, a source of the PMOS transistor Mn1 and a source of the PMOS transistor Mn2 are commonly connected to the input terminal of the automatic constant current regulating module, a drain of the PMOS transistor Mn1 and a drain of the PMOS transistor Mn2 are commonly connected to a drain of the NMOS transistor Mn3, the drain and a gate of the NMOS transistor Mn3 are connected together to a gate of the NMOS transistor Mn4, a source of the NMOS transistor Mn3 and a source of the NMOS transistor Mn4 are grounded, a drain of the NMOS transistor Mn4 is connected to a drain of the PMOS transistor Mn5, a gate and the drain of the PMOS transistor Mn5 are connected together to a gate of the PMOS transistor Mn6, a source of the PMOS transistor Mn5 and a source of the PMOS transistor Mn6 are commonly connected to the second power supply VDD, the second current sensing resistor Rn2 is connected between a drain of the PMOS transistor Mn6 and ground, and the drain of the PMOS transistor Mn6 is connected to the second output terminal of the automatic constant current regulating module.

3. The constant current control circuit according to claim 2, wherein, for each output circuit, the power transistor drive and control module comprises:
an operational amplifier OPn1; and
a PNP-type triode Qn1,
wherein a positive input terminal of the operational amplifier OPn1 is connected to a reference voltage source VREF, a negative input terminal of the operational amplifier OPn1 is connected to the second output terminal of the automatic constant current regulating module, an output terminal of the operational amplifier OPn1 is connected to a base of the PNP-type triode Qn1, a collector of the PNP-type triode Qn1 is connected to the first output terminal of the automatic constant current regulating module, and an emitter of the PNP-type triode Qn1 is the output terminal of the power transistor drive and control module and is connected to the second terminal of the load module.

4. The constant current control circuit according to claim 2, wherein, for each output circuit, the power transistor drive and control modules comprises:
an operational amplifier OPn1; and
an NMOS transistor Mn7,
wherein a negative input terminal of the operational amplifier OPn1 is connected to a reference voltage source VREF, a positive input terminal of the operational amplifier OPn1 is connected to the second output terminal of the automatic constant current regulating module, an output terminal of the operational amplifier OPn1 is connected to a gate of the NMOS transistor Mn7, a source of the NMOS transistor Mn7 is connected to the first output terminal of the automatic constant current regulating module, and a drain of the NMOS transistor Mn7 is the output terminal of the power transistor drive and control module and is connected to the second terminal of the load module.

* * * * *